United States Patent [19]

Schwartz et al.

[11] Patent Number: 5,241,619
[45] Date of Patent: Aug. 31, 1993

[54] WORD DEPENDENT N-BEST SEARCH METHOD

[75] Inventors: Richard M. Schwartz, Sudbury; Stephen C. Austin, Watertown, both of Mass.

[73] Assignee: Bolt Beranek And Newman Inc., Cambridge, Mass.

[21] Appl. No.: 720,652

[22] Filed: Jun. 25, 1991

[51] Int. Cl.$^5$ .............................................. G10L 9/00
[52] U.S. Cl. ...................................................... 395/2
[58] Field of Search .................................. 381/41–45; 395/2

[56] References Cited

U.S. PATENT DOCUMENTS 4,741,036 4/1988 Bahl et al. ............................. 381/43
4,748,670 5/1988 Bahl et al. ............................. 381/43

OTHER PUBLICATIONS

Soong, Frank and Huang, Eng-Fong; "A Tree-Trellis Based Fast Search for Finding the N-Best Sentence Hypothesis in Continuous Speech Recognition"; 1991 International Conference on Acoustics Speech and Signal Processing, May 16, 1991, pp. 705-708.

Schwartz et al.; "The N-Best Algorithm: An Efficient and Exact Procedure for Finding the N Most likely Sentence Hypotesis", IEEE ICASSP, 1990, pp. 1-4.

"The Forward-Backward Search Algorithm", by Austin, Schwartz and Placeway, IEEE ICASSP, Toronto, Canada, May, 1991, pp. 1-4.

Primary Examiner—Michael R. Fleming
Assistant Examiner—Michelle Doerrler
Attorney, Agent, or Firm—Schiller & Kusmer

[57] ABSTRACT

As a step in finding the one most likely word sequence in a spoken language system, an N-best search is conducted to find the N most likely sentence hypotheses. During the search, word theories are distinguished based only on the one previous word. At each state within a word, the total probability is calculated for each of a few previous words. At the end of each word, the probability score is recorded for each previous word theory, together with the name of the previous word. At the end of the sentence, a recursive traceback is performed to derive the list of the N best sentences.

20 Claims, 9 Drawing Sheets

```
1                    Word-Dependent N-Best Search
2
3  static
4  { N    Number of sentence hypotheses desired
5    n    maximum number of word theories to keep at any state
6    beamwidth  fraction of maximum score to set threshold
7    maximum_score_this_frame   used to compute threshold
8    threshold   used for beam search pruning
9    words[]    array to hold a sentence hypothesis
10   word_start_times[] array to hold start times of words in hypothesis
11 }
12
13 main()
14 { /* Each word has several states
15   /*   Each state has a several theories corresponding to different words.
16   /*      Each theory has:
17   /*         previous word
18   /*         score for best path to that state at that time for previous word
19   /*         pointer to previous traceback with a set of word theories */
20
21   /* initialization */
22
23   for all words w
24   {   for all states s in w
25       {   set number of word theories at state to 0
26       }
27   }
28   create one word theory at the initial state of silence; set :
29       prev_word = 0, score = 1, tracebackptr = nil
30
31   /* the main loop over frames or time */
32
33   for all frames
34   {   /* update selected states in selected words based on score */
35       for all words w
36       {   if (maxscore in word w > threshold)
37           {   for all states s in w
38               {   if (best score in state s > threshold)
39                   {   Update_State(s)
40                       if (s is the finalstate of a word)
41                           Save_Traceback_and_Send_to_Grammar_Node(w, s)
42                   }
43               }
44           }
45       }
46       threshold = maximum_score_this_frame * beamwidth
47
48       /* Propagate grammar node scores */
49       for all grammar nodes
50       {   if (best score at node > threshold)
51               Propagate_Node_Scores(node)
52       }
53   }
54   /* At end of sentence, chain back to find sentence hypotheses */
55
56   Trace_Back_N_Best_Paths()
57 }
58
```

*Fig. 4A*

```
1    /****         Update_State(j) ****/
2
3    /* Find best n word theories to state j, distinguished by preceding word */
4
5    /* Each state has several word theories associated with it.
6    /*      For each word theory, there is
7    /*          the highest score from any single preceding state
8    /*              to the state for this word theory
9    /*          pointer to previous traceback structure
10   /*          the previous word in the theory
11   /*          the total score to the state for the word theory
12
13   Update_State(j)
14   {
15       for all preceding states i
16       (   for all word theories at state i
17           ( /* is the theory worth considering */
18             if (total score of word theory at state i > threshold)
19             (   tempscore = score of word theory * prob(state j | state i)
20
21                 search for the word theory at state j that matches this
22                     word theory at state i
23                 if found, modify the matching theory at state j
24                 (   /* remember best tempscore */
25                     if (tempscore > best_score)
26                         best_score = tempscore
27                         /* copy traceback pointer from state with
28                         /* maximum tempscore contribution */
29                         traceback_pointer = pointer from state i
30                         /* also keep sum of tempscore over previous states */
31                         total_score += tempscore
32                 )
33                 if we didn't find a theory for the same previous word
34                 (   create a new entry for this previous word
35                     set:
36                         best_score = tempscore
37                         traceback_pointer = traceback from theory at state i
38                         prev_word = prev_word from theory at state i
39                         total_score = tempscore
40                 )
41                 sort word theories in state j according to total score
42                 only keep n word theories
43             }
44           }
45       )
46       if (state is not a final state of a word)
47           multiply total scores for all word theories by
48               prob(spectrum | state j)
49
50       return
51   }
52
```

Fig. 4B

```
1  /****        Save_Traceback_and_Send_To_Grammar_Node(word,state)
2
3  /* Save the alternative word theories at final states of a word. */
4  /* Only send score for best previous word to following grammar node */
5  /* and give it the identity of the word that just ended. */
6  /* Keep up to n separate word theories at the grammar node. */
7
8  /* We assume each traceback structure contains:
9  /*      time = current frame
10 /*      number of word theories
11 /*      for each word theory:
12 /*          prev_word
13 /*          total score of this word theory
14 /*          pointer to previous traceback structure
15 /* We assume each grammar node contains several word theories.
16 /*      Each word theory has a structure containing:
17 /*          word that just ended
18 /*          best score for this word at this time
19 /*          pointer to previous traceback structure
20 /*          total score for this word at this time */
21
22 Save_Traceback_and_Send_to_Grammar_Node(word,state)
23 {
24     /* Save a traceback structure with all theories for previous words */
25     get a new traceback structure
26     store:
27         time now
28         number of word theories
29         for each word theory:
30             prev_word
31             total score
32             pointer to previous traceback structure
33     replace traceback pointer on final state with pointer to new structure
34
35     /* send top choice on to following grammar node */
36
37     find the grammar_node following word
38     get score and traceback pointer from best word theory at final state
39     search among word theories in the grammar node for a path from "word"
40     if found
41     {   keep best single score
42         keep traceback pointer corresponding to best score
43         also compute total score
44     }
45     if not found
46     {   make a word theory, set:
47             prev_word (=word)
48             best score
49             traceback pointer
50             total score
51     }
52     sort word theories in grammar node according to total score
53     only keep n word theories
54
55     return
56 }
57
```

*Fig. 4C*

```
1  /****        Propagate_Node_Scores(node)      ****/
2
3  /* Send all scores from grammar node1 to all following grammar nodes
4  /* and to all following words.
5  /* At each destination grammar node or word beginning, keep up to n
6  /* word theories.
7  /* Note: grammar nodes must be evaluated in correct
8  /* "dynamic programming" order for this to work properly */
9
10 Propagate_Mode_Scores(node1)
11 {
12      for all following grammar nodes node2
13      {   for all word theories at node1
14          {   /* multiply word theory score by the probability of going from
15              /* grammar node node1 to node node2 */
16              newscore = word_theory->score * prob(node2 | node1)
17              search among word theories in node2 for same previous word
18              if found
19              {   keep best single score
20                  keep traceback corresponding to best newscore
21                  compute total score hypotheses for same word theory
22              }
23              if not found
24              {   make a new entry with the new word
25                  set:
26                      best score = newscore
27                      trackback pointer
28                      prev_word (=word)
29                      total score = newscore
30              }
31              sort word theories according to total score
32              only keep n word theories
33          }
34      }
35      for all following words word
36      {   /* do the same as above except that */
37          a - use prob(word | node1) instead of prob(node2 | node1)
38          b - Put scores into initial state of the following word
39          c - update the maximun score for the word if appropriate
40      }
41      return
42 }
43
```

Fig. 4D

```
1  /****          Trace_Back_N_Best_Paths()         ****/
2
3  /* Traceback for finding the N-Best whole sentence hypotheses
4  /* out of the saved traceback structures.
5  /* Look for all hypotheses within beamwidth of the best.
6  /* This routine is called once to initialize the call to Trace */
7
8  Trace_Back_N_Best_Paths()
9  {
10     accum = score of the best sentence hypothesis at end node of grammar
11     threshold = accum * beamwidth
12     tbstruct = traceback structure of best hypothesis
13     /* last word is always silence */
14     words(1) = silence
15
16     /* call recursive routine to find the rest of all of the sequences */
17     Trace(accum,1,tbstruct)
18
19     return
20  }
21
```

Fig. 4E

```
1  /****         Trace (accum,pos,tbstruct)              ****/
2
3  /* This is the recursive Trace routine */
4
5  /* It is called with a partial theory.
6  /* It recursively tries to extend the theory by each possible word choice.
7  /* For each choice, it recursively calls Trace to extend that hypothesis.
8
9  /* accum = best score of any theories that could result from partial theory
10 /* pos = the length of the current word string
11 /* tbstruct = pointer to the current traceback structure
12
13 /* word [] is a global array - i.e. there is only one sentence at a time. */
14 /* word_choice and arguments are multiply defined on the stack. */
15
16 /* We assume that the word theories in each traceback structure are sorted
17 /* in order of decreasing total score */
18
19 Trace(accum,pos,tbstruct)
20 {
21     If the accumulated score is already below the threshold
22         return(-1)   /* abort the hypothesis */
23
24     /* if we have reached beginning of utterance, save the hypothesis */
25     if (tbstruct->time = 0)
26     {   Record_Hypothesis(pos-1,accum)
27         return(0)
28     }
29     pos = pos + 1    /* add one word */
30
31     /* iterate through the alternative word choices in tbstruct
32     /* following each back */
33     /* get first choice from tbstruct */
34     word_choice = 1
35     top_score = tbstruce->total_score[1]
36     {
37         /* add word to the sequence */
38         words[pos] = tbstruct->prev_word[word_choice]
39         newscore = accum * tbstruct->total_score[word_choice] / top_score
40         newtbstruct = tbstruct->tbstruct[word_choice]
41         word_start_times[pos-1] = newtbstruct->time
42         /* look back further for the rest of the sequence */
43         result = Trace(newscore, pos, newtbstruct)
44         /* try next choice or quit */
45         word_choice = word_choice + 1
46     } until (result == -1 OR
47             word_choice > tbstruct->number_of_word_theories)
48
49     return(0)
50 }
51
```

Fig. 4F

```
1  /****        Record_Hypothesis (pos,accumscore)       ****/
2
3  /* Record words and score for a single sentence hypothesis, */
4
5  /*If desired, keep only  N theories. If we have more than N hypotheses,
6  /*increase the threshold to the lowest of the N.
7  /*This can be implemented efficiently using a standard binary tree sort */
8
9  Record_Hypothesis (pos,accumscore)
10 {
11      increment num_hypotheses_saved
12
13      save sequence of pos words (and word_start_times - if desired)
14          and accumscore for the hypothesis
15      if (num_hypotheses_saved > N)
16      {   remove lowest scoring hypothesis
17          set threshold to the new lowest hypothesis
18      }
19      return
20 }
21
```

*Fig. 4G*

WORD DEPENDENT N-BEST SEARCH METHOD

The U.S. Government has a paid-up license in this invention and the right in limited circumstances to require the patent owner to license others on reasonable terms as provided for by the terms of contract No. N00014-89-C-0008 awarded by the Defense Advanced Research Projects Agency and monitored by the Office of Naval Research.

FIELD OF THE INVENTION

This invention relates to recognition of human speech by computer. More particularly, it relates to systems for and methods of finding the several most likely word sequences from an observed acoustical utterance based upon acoustical and statistical models of language.

BACKGROUND OF THE INVENTION

It has been the goal of many scientists for over 40 years to produce apparatus that would translate normal spoken language accurately into its written equivalent and meaning. The task has turned out to be much more difficult than ever imagined. The number of variations in acoustic characteristics that can produce even one single word seem endless. The variations are due to many factors, among which are different dialects, accents, and pitches of the speakers, and differing emphasis based on the context in which the word is used. Even the mood of the speaker affects the acoustic content.

In spite of the difficulties, substantial progress has been made towards the overall goal. Current systems can recognize sentences from limited vocabularies of about a thousand words with better than 95% accuracy. The approach generally relies upon acoustic and statistical models of language. Speech is modeled at several different levels. Sentences are modeled using a grammar that specifies likely sequences of words; words are modeled using a phonetic dictionary that specifies likely sequences of phonemes, and phonemes are typically modeled using a hidden Markov model, a statistical model of the acoustics of speech, that specifies likely sequences of acoustic spectra. A recognition search is performed to find the most likely sentence, given the input speech spectra and the various models of speech.

In a typical system, an electrical audio signal containing information representing human speech is divided into frames of 10 millisecond duration, each of which is quantized according to its respective spectral content into one of a finite number of vectors, often called spectra. The speech recognition system, in order to determine the sentence that was uttered, typically performs what is known as a beam search. At the arrival of each new vector, a new Markov state is considered to exist. At each state the probability is calculated that that state, as it succeeds the preceding state, is part of a particular phoneme that can be the next part of a particular word. The calculation is made for each state of each phoneme of each word under consideration. At the beginning of a word, several words in the vocabulary are under consideration. Since there are several possibilities for each phoneme, the search could further expand with each state, branching in a tree-like structure. To make the calculation practical, however, the beam search is pruned by dropping unlikely branches. The specific criteria for dropping a branch, which determine the width of the beam search, are controllable parameters of the search.

In order to determine the probabilities for the various models, a training process is first implemented; a large number of sentences spoken in the limited vocabulary and context of the system are analyzed, the various state, phoneme and word paths determined, and the associated probabilities assigned. The training can be by a single speaker, or a group of speakers. The larger and more diverse the training group, of course, the greater number of likely paths for each word, but the more accuracy that can be expected in recognizing speech from a large number of unknown speakers. Recordings of a few semi-standard training sessions, known as corpora, are commercially available.

For simple language models, a 1-best search for the single most likely state sequence can be readily performed by the well known time-synchronous Viterbi decoder. The basic concept of this decoder is that at each state within a word or grammar node between words, only one theory is kept for the most likely state sequence to get to that state or node at a particular time. The decoder finds the single most likely sequence of states, given the input speech. The word sequence that corresponds to the most likely state sequence is then selected as the 1-best sentence output, even though this is not necessarily the most likely sequence of words. While this is very efficient in terms of the computation involved, the accuracy may suffer; a full search should compute the sum of the probabilities of all state sequences for each possible word sequence. For more complex language models, e.g., when a linguistic model of natural language is used, even the 1-best search becomes too expensive in terms of computation to be feasible due to the larger number of states in the model. In this case, practical systems may make use of what has been called the N-best search paradigm.

To implement this paradigm, the various available knowledge sources, which can contribute to the task of speech recognition are ordered according to their relative power and computational cost. Those that provide more constraint, at a lesser cost, are used first in an N-best search. The output of this search is a list of the most likely whole sentence hypotheses, along with their accumulated probability scores. These hypotheses are then filtered, i.e. rescored, by the remaining knowledge sources, and the highest overall scoring sentence chosen as the solution. This approach has produced some impressive results.

In addition to its use in complex language model speech recognition systems, an N-best search can be used for other related purposes. For example the alternative sentences it produces can be used as additional hypotheses for corrective training techniques. The N-best search can also be used to evaluate the effectiveness of new knowledge sources as well as the combination of hidden Markov model (HMM) technology with different recognition technologies. A HMM N-best recognizer system first produces an extensive sentence list including respective scores. Then the alternative recognition system, based on the new knowledge source or another technology, such as, for example, a stochastic segment model or a segmental neural network, is used to rescore each of the N-sentence hypotheses. The optimal linear combination of the log scores from the different systems is used to reorder the sentence list. The effectiveness of the added source or technology is easily evaluated. Since the systems under evaluation need consider only the N-sentences produced by the N-best search, computation is in each case greatly reduced.

A method of performing a very accurate N-best search was disclosed in the paper by Richard Schwartz and Yen-Lu Chow, "The N-Best Algorithm: An Efficient and Exact Procedure for Finding the N Most likely Sentence Hypotheses", IEEE ICASSP, 1990. This sentence-dependent method bears considerable similarity to the time-synchronous Viterbi decoding method. It differs, however, in that multiple theories are kept at each state within a word. If two or more theories at a state involve identical sequences of words, their probability scores are added; otherwise an independent score is kept for each different preceding sequence of words. All different theories at each state are preserved as long as they are above the global pruning threshold and within the state beamwidth.

While the above method has proven practical and accurate for very simple grammar models, it is still too expensive in terms of the amount of computation required for more complex models.

One less expensive approach which has been proposed is the tree-trellis N-best algorithm. See, for example, Soong, Frank and Huang, Eng-Fong; "A Tree-Trellis Based Fast Search for Finding the N-Best Sentence Hypotheses in Continuous Speech Recognition"; 1991 International Conference on Acoustics, Speech and Signal Processing; May 16, 1991, pages 705-708. This particular approach, however, is less accurate than the sentence-dependent N-best algorithm.

OBJECTS AND SUMMARY OF THE INVENTION

An object of this invention is to provide a system for and method of determining from a spoken utterance the N-best sentence hypotheses that requires much less computation yet retains almost the same accuracy.

Another object is a speech recognition system and method that can use a fairly complex grammar model and still operate with only a short delay from real time.

To produce the N most likely sentence hypotheses from a speech signal, the speech signal is divided into frames, and at least one characterizing vector is generated each frame. For each frame, word theory probability scores are computed for selected Markov states in selected words to generate the combined probability of each partial sentence hypothesis and the sequence of vectors, based on hidden Markov models. At each of the selected states, a separate combined probability score is accumulated for each of n most likely single previous word theories, n being much smaller than N. At the end of each word, the accumulated probability scores and the identities of their respective previous word theories are recorded. The first state of each new word is started with the combined probability score of each of n respective previous words and the new word according to a grammar model. At the end of the utterance, the N different word sequences that have the highest accumulated scores are reassembled.

Other objects of the invention will in part be obvious and will in part appear hereinafter. The invention accordingly comprises the processes involving the several steps and the relation and order of one or more of such steps with respect to each of the others, and the apparatus possessing the construction, combination of elements, and arrangement of parts exemplified in the following detailed disclosure, and the scope of the application of which will be indicated in the claims.

BRIEF DESCRIPTION OF THE DRAWINGS

For a full understanding of the nature and objects of the present invention, reference should be had to the following detailed description taken in connection with the accompanying drawings wherein:

FIGS. 4A-4G are illustrations of psuedo-code used in the preferred system and method of the present invention.

DETAILED DESCRIPTION OF THE DRAWINGS

Figure 1:
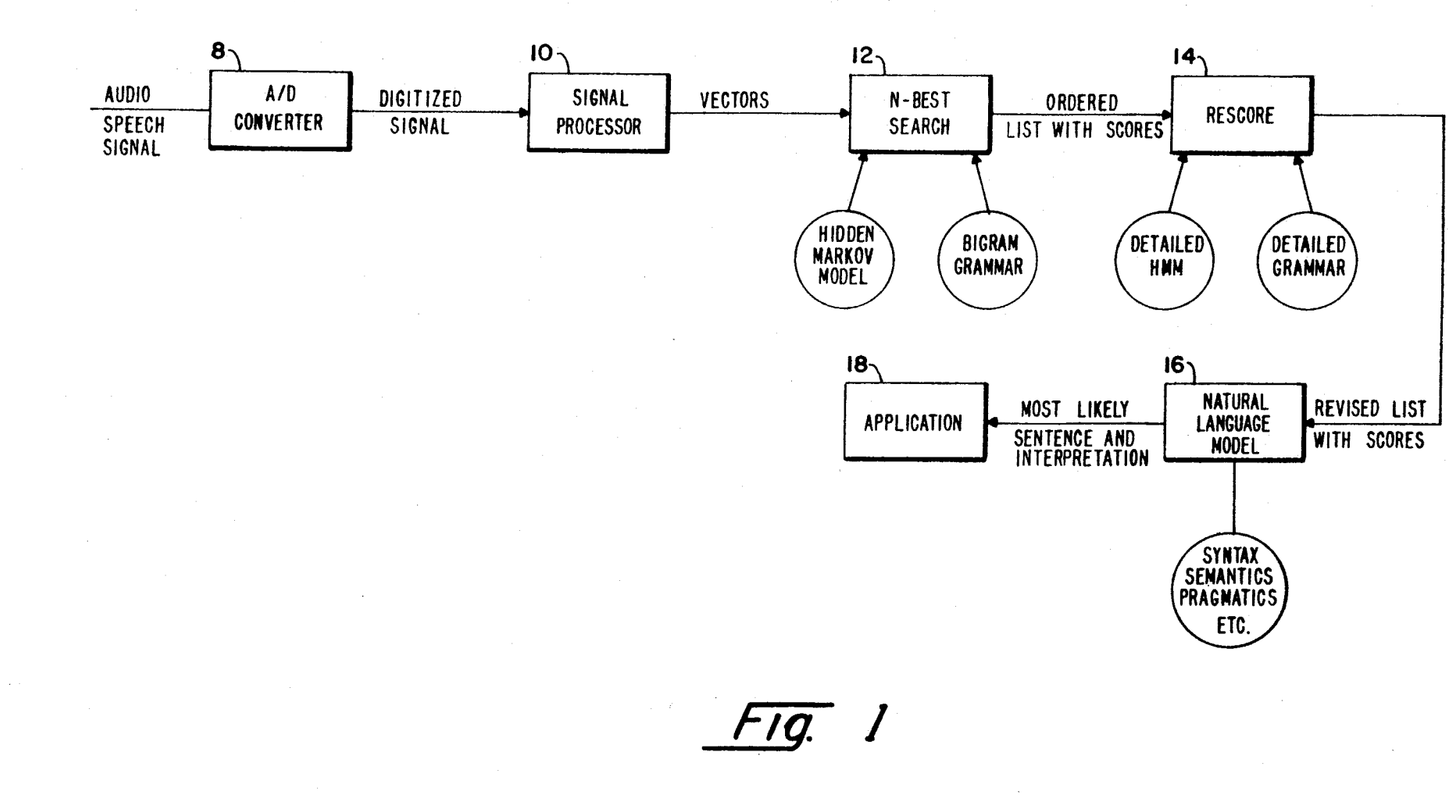
FIG. 1 is a block diagram of the preferred embodiment of the speech recognition system embodying the present invention.

A particularly useful speech recognition system that advantageously may be used to perform the steps of the method of the invention is shown in block diagram form in FIG. 1. In this system an audio speech signal resentative of speech, sensed for example by a microphone not shown, is applied to an analog-to-digital (A/D) converter 8 before being fed to a signal processor 10. The converter 8 samples the signal at a predetermined rate, e.g., 16 Khz, and is a commercially-available type well known in the art. The signal processor is also a commercially available type adapted to be used for array processing and can be, for example, the plug-in board sold under the name Sky Challenger by the Sky Computers, Inc. of Lowell, Mass. The processor divides the samples into frames of 320 samples each of 20 msec duration. The frames may then be encoded in processor 10 by Cepstral coding techniques, outputting a Cepstral vector for each frame at a 100 Hz. rate. The vectors may be in the form of 8-bit words, reflecting quantization into 256 levels. Such Cepstral encoding techniques are well known in the speech recognition field. Of course, the invention is not limited to this specific coding process; other sampling rates, frame rates and other representations of the speech signal can be used as well. The Cepstral vectors generated by signal processor 10 are used as an input to block 12, where an N-best search is performed according to the invention. The models used for the N-best search may be, for example, a hidden Markov model and a bigram statistical grammar model, both well known in the art and derived from a corpus resulting from one or more training sessions. The output from the N-best search is an ordered list of the N-best sentences along with their respective probability scores. Since the probabilities determined by the N-best search method are cumulative, requiring each new probability to be multiplied by the previous, the scores may advantageously be in the form of logarithms for easy accumulation. N, of course, need be only large enough to ensure that the correct sentence is included in the list an acceptable percentage of the time. Where the degree of uncertainty is high, N can reasonably be as high as 100 or more.

The sentence list may then be rescored according to another speech recognition program represented by block 14, which may use a more detailed hidden Markov model and more detailed, higher ordered grammar model, e.g., a trigram or higher ordered class grammar model. In this program, various steps may be weighted more heavily based upon the particular knowledge sources used. Since the combined probability desired is the product of probabilities, the log scores determined by the two programs can be added directly. The revised N-best list with its updated scores may then be evaluated by a natural language model block 16. The natural language model may be based on syntax, semantics, pragmatics, etc. to determine which of the N sentence hypotheses make sense. The output of the natural language evaluation is the one most likely sentence and its interpretation, which may be acted upon by an application program, block 18. The application program may, for example, control a process, execute a command, or query a data base.

The foregoing block functions 12-18 can be accomplished by a suitable workstation containing a CPU, such as the Sun 4-330 manufactured and sold by the Sun Microsystem Inc. of Mountainview, Calif.

The system of FIG. 1 represents a good application of the N-best paradigm. The total amount of computation required by the system is feasible because the rescoring program 14 and the natural language model 16 need operate only on the limited N-best list of likely sentences provided by the N-best search 12. Since the N-best search performed by the method of the invention is itself feasible because of the reasonable amount of computation it involves, the whole system is feasible and yields accurate results.

The N-best search method of the invention is based on the premise that the starting point of any word most likely depends upon the immediate prior word but not on any word uttered earlier. During a forward pass of the search, therefore, unlike the sentence-dependent N-best method, different state sequence theories within a word are distinguished only by the single immediately prior word. At each state within a word the total probabilities need be preserved for only a few different preceding words. At the final state for each word, all of the alternate (word) theories along with their scores, and the name of the corresponding word are saved. When a word ends, then the best single score for that word is used in generating new forward paths. When the utterance is completed, the N-best sentences are determined by chaining backwards from word to word to the beginning of the utterance and assembling the word sequence paths with the highest total probability.

One effective computer program for performing an N-best search according to the method of the invention in carrying out the functions associated with blocks 12-18 is shown in pseudo code form in FIGS. 4A-4G. An explanation of the pseudo code may be useful in gaining a more thorough understanding of the invention.

The pseudo code is written in two styles: some is in the syntax of the C programming language, and some is plain English. Any line beginning with /* is a comment. Each subroutine is on a separate page. Lines in each subroutine are numbered sequentially. Blocks of code are marked by pairs of {} and indented appropriately.

In the following description, when part of the description refers to a particular region of code, the range of lines will be indicated by <a-b> or just <a>, in the case of a single line, where "a" and "b" are two line numbers.

All of the arithmetic values described here assumes that scores are probabilities. Frequently, to avoid numeric underflow problems, log probabilities may be used. In this case, all multiplies and divides are changed to adds and subtracts, all "max" operations remain the same, and when two probabilities are added a fast table lookup routine, given log(a) and log(b), returns log(a+b).

Word-Dependent N-Best Search

The main program shown in FIG. 4A consists of an initialization phase <21-29>, a relatively expensive time-synchronous loop on all frames that operates from beginning to end <31-53>, and a very fast traceback operation that operates from end to beginning <56>.

To save computation, those states that are less likely to affect the answer are not updated. Line <38> indicates that the states selected to be updated are those based on the score of the most likely word theory at that state. Another efficient and alternative way accomplishing this result is to group the states in a word that correspond to the same phoneme. Then, if any state within a phoneme has a good score, all of the states within that phoneme are updated.

In line <41> all of the alternate word theories for the preceding words that are at the final state of each word are saved. These blocks of alternate word choices, which are called traceback structures, are used at the end of the computation to reconstruct the N most likely sequences of words.

The global threshold is computed in line <46> as some fraction of the most likely word theory score at any state in this frame. This threshold is used until this same point in the computation for the next frame. The beamwidth is typically a fraction on the order of $10^{-10}$ or $10^{-20}$.

In lines <49-52>, when theory scores are then propagated from one grammar node to another, if this grammar node was not on the list of nodes with scores above the threshold, it must be added. In order for this to work efficiently, the grammar nodes must be in "dynamic programming" order, which means that, for any two grammar nodes, if node 1 could follow node 2, then node 2 must be ordered later in this loop.

The call to Trace_Back_N_Best_Paths() in line <56> creates a set of N sentence hypotheses, each with a score. At this point, the alternative answers can be printed out or fed to another program for further evaluation.

Update_State (j)

One of the main features of this algorithm illustrated in FIG. 4B is that there are several word theories at each state instead of just one. This subroutine computes a new set of word theories at state j, ending at the current frame. It accumulates theories from all states that could precede state j <15>. Each of the word theories at each preceding state <16> are considered. We combine theories that have the same previous word, which requires that we find any matching word theories in state j for a particular word theory at state i <21-22>. The pseudo code for setting the fields of the word theory <24-32> and <34-40> is more detailed here than in similar instances in other routines, where the general comments like "keep the best score and corresponding traceback pointer" are used. In addition to remembering the score of the best contributing word theory, the sum of the contributions from the preceding states for a particular previous word are computed <31>. The number of word theories that are kept at a single state are limited to a small number, n <42>. Alternatively, the theories to those with a score above the threshold can also be limited.

The only place where the input speech spectrum for this frame is incorporated is in <46–48>. The final state of a word is a "pseudostate" which has no spectral probability density associated with it, and therefore, spectral probabilities are not assigned to it.

Save_Traceback_and_Send_to_Grammar_Node (word,state)

Referring to FIG. 4C, at the end of each word, several word theories corresponding to different previous words are provided. The final state of each word model has no spectral probability density associated with it. It can only be followed by a grammar node. In lines <2-5-32> a permanent traceback structure is allocated and the alternative word theories are saved. The traceback pointer on the final state is replaced with a pointer to this new structure <33>, so that any future theories that descend from this theory will point back to the saved traceback structure. Next, the top theory is sent from this final state to the grammar node that follows the word <37-53>. As in Update_State, word theories are matched up at the grammar node according to the previous word, in this case, the word that just ended <39>. Again, a limited number of word theories are kept at each grammar node, based on their scores <5-2-53>.

Propagate_Node_Scores (node)

Figure 4D:
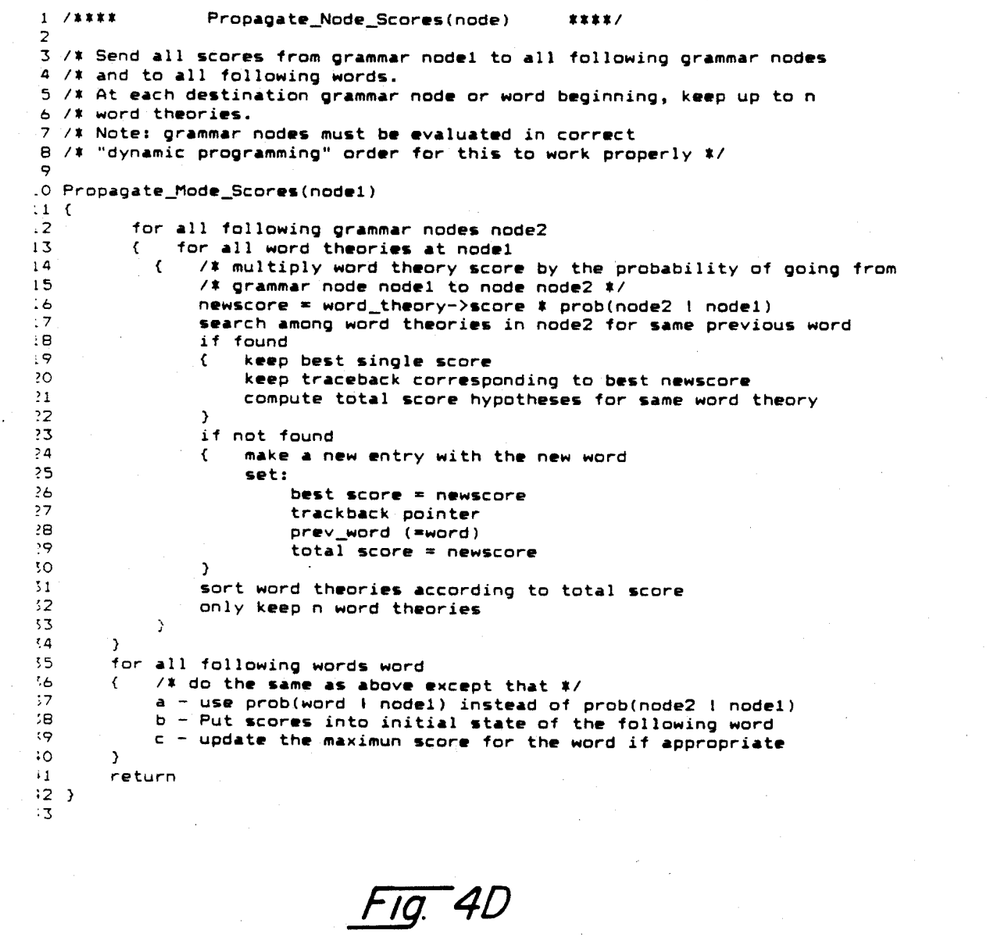

Referring to FIG. 4D, this routine sends all theories scores from one grammar node to all following grammar nodes <12-34> and to the initial states of all following words <35-40>. Again, at each destination grammar node or word beginning, multiple word theories are kept. In this routine the grammar probabilities that a particular grammar node will be followed by another grammar node <16>, or that a node will be followed by a particular word <37> are applied. These grammar probabilities reflect the probabilities of different sequences of words. In practice, these probabilities are often based on the probability of each pair of word classes. This type of grammar is called a statistical bigram class grammar.

In lines <36-39> where theories are propagated to word beginnings, the algorithm is essentially identical to lines <12-34>, except that the grammar probabilities are different, the theories are put into the initial states of the words, and if the words to consider are selected based on the maximum word theory score in the word, that maximum must be updated accordingly.

Trace_Back_N_Best_Path ()

Figure 4E:
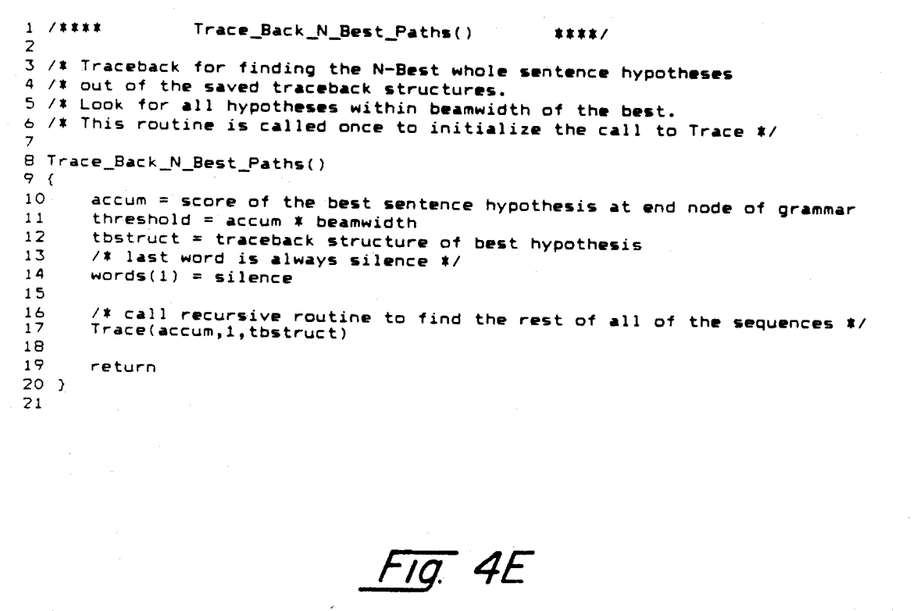

Referring to FIG. 4E, the top level traceback routine is called once. It sets up a recursive call to the routine Trace (see below). In line <10> the distinguished "end node" of the grammar that must end all sentences is looked at, resulting in a set of up to N sentence hypotheses that all have a score within a factor of beamwidth of the best sentence hypothesis. Typically, the total computation for the recursive traceback is a small fraction of a second.

Trace (accum,pos,tbstruct)

Figure 2:
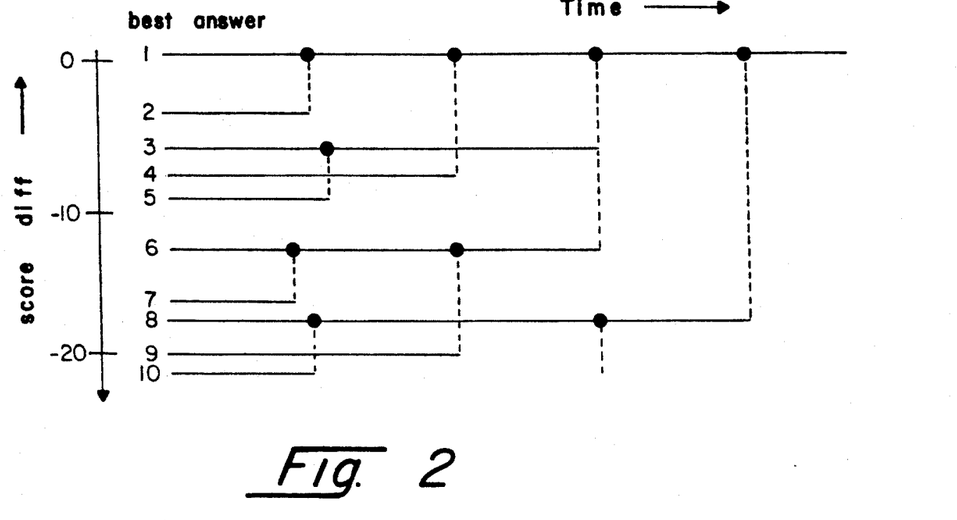
FIG. 2 is a word-time diagram useful in explaining one step of the method of invention.

FIG. 2 shows a schematic example of the traceback structures that might result from the N-Best computation. This recursive routine, illustrated in FIG. 4F, is used to consider the alternative word sequences that can be constructed from various permutations of the alternate word theory choices saved in the traceback structures. It operates backwards, chaining through the traceback structures that were created in the forward direction. It is called with a partial theory, represented by the words in the global "words" array from 1 to pos. "accum" is the score of the best theory that could be constructed using these words so far. It tries to extend the theory by each possible word choice at that point. For each choice, it recursively calls Trace to extend that hypothesis back further.

If, at any point, the "accum" score is below the threshold, then any extension of this partial hypothesis would also have a low score, and therefore, this traceback path is aborted as are all paths that result from it <21–22>. If the theory spans the whole utterance, than the sentence hypothesis that resides in the "words" array <24–28> can be recorded.

In the initialization and loop from <31–47> each of the choices for the next word are considered. If desired, we can also determine the beginning time of each word in the hypothesis <41>.

Record_Hypothesis (pos, accumscore)

Figure 4G:
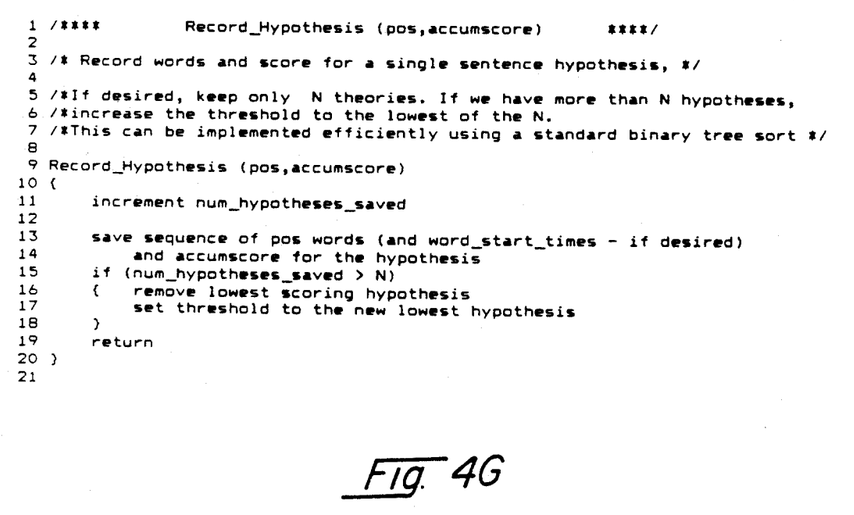

The routine shown in FIG. 4G records a single sentence hypothesis, residing in "words" and "word_start_times" from 1 to pos (in reverse order), with score "accumscore". If the number of sentence hypotheses are limited to a fixed limit, N, then the threshold can be reset to the Nth hypothesis <17>. This reset threshold, which is used in the Trace routine, will abort more search paths, thus speeding up the recursive computation. Alternatively, we can ignore N, or set it to a large number, to obtain all hypotheses within the beamwidth of the top hypothesis.

Figure 3:
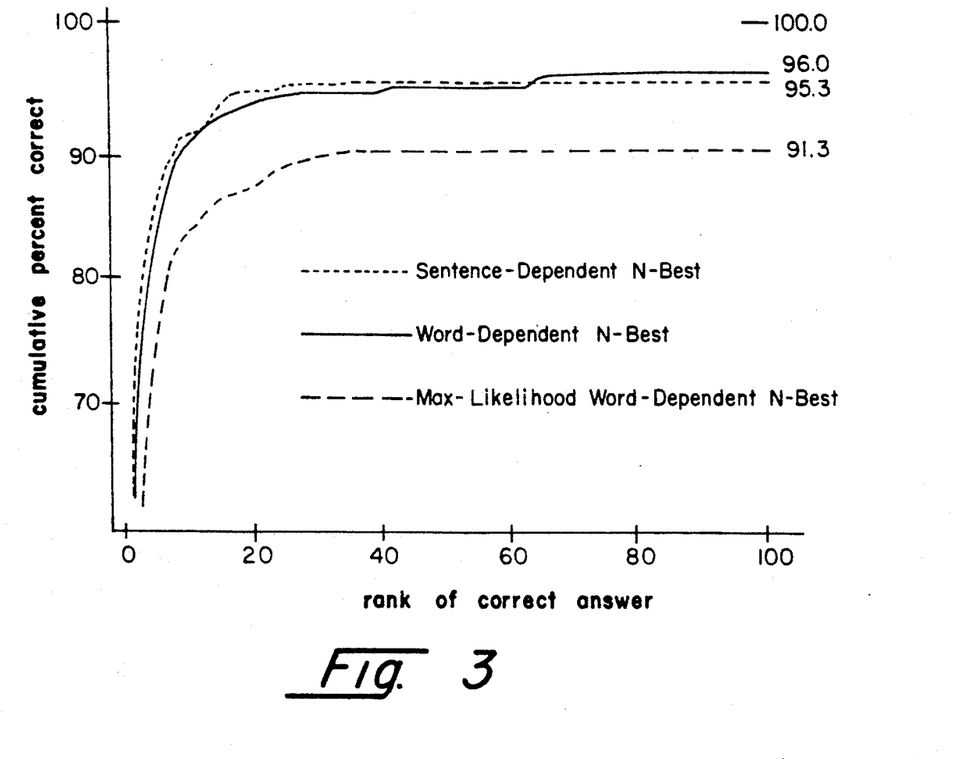
FIG. 3 is a distribution plot showing the effectiveness of the method of the invention.

Although the word dependent search method of the invention requires far less computation than the previously mentioned sentence-dependent N-best method, it nonetheless, surprisingly, can provide results that are substantially just as good. FIG. 3 is a plot showing experimental results comparing the accuracy of these two N-best methods as well as a maximum likelihood state sequence word-dependent N-Best method. The experiments were performed using the speaker-dependent subset of the DARPA 1000-word Resource Management Corpus and a weak, first order statistical grammar based on 100 word classes. The test set used was the June '88 speaker-dependent test set of 300 sentences. In FIG. 3, the cumulative percent correct is plotted on a truncated ordinate scale against abscissas representing the rank order of the correct answer. The two curves are remarkably similar for the sentence-dependent N-best and word-dependent N-best, showing in each case that the correct answer was ranked first over 60% of the time. While the correct sentence showed up in the first 30 slightly more often with the sentence-dependent method, it showed up in the first 100 slightly more often with the word-dependent method. In both cases it was close to 95%, superior to the maximum-likelihood word-dependent N-best approach which provided a 91.3 percent accuracy. With more complex acoustic modelling, even better results can be expected.

The computational effectiveness of the word-dependent method of the invention can be still further enhanced if it is used in a forward-backward search such as described in the paper, "The Forward-backward Search Algorithm", by Austin, Schwartz and Placeway, IEEE ICASSP, Toronto, Canada, May, 1991.

This method is performed in two passes, a forward pass which uses a simplified algorithm, and a backward pass which uses information computed in the forward pass to perform a more complicated algorithm in a fraction of the time it would normally take. The forward pass may follow for example, the Viterbi 1-best method, using a simplified acoustic model and a simplified language model. While the forward search is performed, the scores of the final state of each active HMM that represents a word ending are recorded at each frame of the utterance, together with a record of which HMMs were active.

After the simplified forward pass has been completed, the word-dependent N-best search of the invention is performed in reverse. It starts by taking the final frame of the utterance and works its way back, matching frames earlier in the utterance until it reaches the start of the utterance. The first task in the implementation is to make the second pass operate in reverse. This can be done in two ways; the algorithm can be made to scan the utterance in reverse and trace the grammar transitions backwards, which requires a small change in the program. Alternatively, the utterance itself can be reversed as well as the transitions in the HMMs and grammar, which allows the actual algorithm to remain the same.

After the backward pass has been modified to run in reverse, a small additional modification is needed to complete the implementation. At each frame the backward algorithm must propagate scores from an active word w back through the grammar to another word w', at the same time calculating the HMM/grammar score for w' for the next frame (actually the previous frame in the utterance). In a normal beam search, this score would be compared to the pruning threshold in order to limit the number of theories in the search, but in the forward-backward search two additional tests are applied. First, word w' must have ended with a good score at that time, and second, the product of the forward ending score of w' and the backward score of w' must be within the beamwidth of the maximum such product at this frame. As a result of this pruning, the backward pass runs one or two orders of magnitude faster than it would normally. This increase in speed makes it possible to compute the N-best hypotheses for a 1000 word vocabulary continuous speech system on a work station.

The word dependent, N-best approach described above is also an improvement over the sentence-dependent N-best approach as being substantial as accurate at a smaller cost, and the tree trellis N-best approach described by Soong et al., supra, since the latter approach is not word dependent, is not time synchronous in the backward path, and does not add sequences that correspond to the same word sequences, and is therefore less accurate.

Since certain changes may be made in the above processes and apparatus without departing from the scope of the invention herein involved, it is intended that all matter contained in the above description or shown in the accompanying drawing shall be interpreted in an illustrative and not in a limiting sense.

We claim:

1. A method of producing N-most likely sentence hypotheses defined as word sequences of one or more words from a limited vocabulary speech signal, each word having a set of states including a distinguished first and last state, said method comprising the steps of:

a. dividing the speech signal of an utterance into frames and generating for each frame at least one vector that characterizes the speech signal;
   b. computing for each frame for selected states in selected words, the probability of a sequence of vectors up to each such frame, given a most likely partial sentence hypothesis that begins with the utterance and ends with that state at that frame;
   c. at each of said selected states accumulating a separate probability score for each of m most likely different partial sentence hypotheses that begin with the utterance and end at this state at that frame, but that differ in the previous word to the word to which this state belongs so as to provide m previous-word theories having respective identities, wherein m is an integer;
   d. recording at each frame for the last state of each word the accumulated probability scores together with the identities of the respective previous-word theories;
   e. starting the first state of each word with the probability score of each of n most likely respective previous-word theories and each said word according to a grammar model, wherein n is an integer; and
   f. at the end of the utterance reassembling N likely different sentence hypotheses that have the highest accumulated scores using the recorded probability scores and previous-word theories recorded in step d so as to provide the N-most likely sentence hypotheses, wherein N is an integer.

2. A method as in claim 1, wherein said step c further comprises the step of adding the respective probability scores of two or more word theories having the same single previous word and arriving at the same state at the same time so as to provide a combined previous-word theory.

3. A method as in claim 1, wherein said step e further comprises the step of adding the respective probability scores of two or more word theories having the same single previous word and arriving at the same state at the same time so as to provide a combined previous-word theory.

4. A method as in claim 1, wherein said selected states of step b comprise select Markov states, said select Markov states being states in which the most likely previous-word theory probability score is within a predetermined range of the most likely previous-word theory probability score for any state in the previous frame.

5. A method as in claim 1, wherein said selected words are words in which the most likely previous-word theory probability score of any state within that word is within a predetermined range of the most likely previous-word theory probability score for any state in the previous frame.

6. A method as in claim 1, wherein said selected states in step b are selected Markov states, step b includes the step of computing for each frame for additional Markov states, the probability of the sequence of vectors up to each such frame, said Markov states being organized in groups such that said selected Markov states are states belonging to a group in which the maximum word theory probability score is within a predetermined range of the maximum word theory probability score for any state in the previous frame.

7. A method as in claim 1, wherein said vector characterizes the spectral content of said speech signal.

8. A method as in claim 7, wherein said vector is a Cepstral vector.

9. A method as in claim 1, wherein a plurality of dissimilar vectors are generated for each frame.

10. A method as in claim 1, wherein said grammar model is a bigram class grammar model based on pairs of word classes.

11. A method as in claim 1, wherein said steps b and c are performed one frame at a time in a time synchronous manner.

12. A method as in claim 1, wherein said frames overlap.

13. A method as in claim 1, wherein in step b the selected states are selected Markov states, and said computation is based on corresponding hidden Markov models.

14. A method as in claim 13, further comprising the steps of:
  g. rescoring each of the N different sentence hypotheses from step f using different models from said hidden Markov models corresponding to said Markov states, and;
  h. multiplying the different probability scores for each of said N different word sequences from step f so as to produce the combined probability scores of said models.

15. A method as in claim 14, wherein said different models are more detailed than said hidden Markov models.

16. A method as in claim 1, wherein the grammar model used in step e is a bigram grammar model, said method further comprising the steps of:
  g. rescoring each of the N different sentence hypotheses from step f using a different grammar model from said bigram model, and;
  h. multiplying the different scores for each of said N different word sequences from step f so as to produce the combined probability scores of said models.

17. A method as in claim 16, wherein said different grammar model is a higher ordered model than said bigram model.

18. A method as in claim 1, wherein the method is performed in two passes, a forward pass using a relatively simplified algorithm, and a backward and best pass using information computed in the forward pass to perform steps b, c, d and e.

19. A method as in claim 18, wherein the steps b, c, d and e are performed in reverse order one frame at a time in a time synchronous manner.

20. A system for producing N-most likely sentence hypotheses defined as word sequences of one or more words from a limited vocabulary speech signal, each word having a set of states including a distinguished first and last state, said system comprising:
  a. means for dividing the speech signal of an utterance into frames and generating for each frame at least one vector that characterizes the speech signal;
  b. means for computing for each frame for selected states in selected words, the probability of a sequence of vectors up to each such frame, given a most likely partial sentence hypothesis that begins with the utterance and ends with that state at that frame;
  c. means for accumulating at each of said selected states a separate probability score for each of m most likely different partial sentence hypotheses that begin with the utterance and end at this state at that frame, but that different in the previous word to the word to which this state belongs so as to provide m previous-word theories having respective identities, wherein m is an integer;
  d. means for recording at each frame for the last state of each word the accumulated probability scores together with the identities of the respective previous-word theories;
  e. means for starting the first state of each word with the probability score of each of n most likely respective previous-word theories and each said word according to a grammar model, wherein n is an integer; and
  f. means for reassembling at the end of the utterance the N likely different sentence hypotheses that have the highest accumulated scores using the recorded probability scores and previous-word theories recorded in step d so as to provide the N-most likely sentence hypotheses, wherein N is an integer.

* * * * *

UNITED STATES PATENT AND TRADEMARK OFFICE
CERTIFICATE OF CORRECTION

PATENT NO. : 5,241,619

DATED : August 31, 1993

INVENTOR(S) : Richard M. Schwartz and Stephen C. Austin

It is certified that error appears in the above-identified patent and that said Letters Patent is hereby corrected as shown below:

Claim 20, column 12, line 24, delete "different" and insert -- differ --.

Signed and Sealed this

Fifteenth Day of March, 1994

Attest:

BRUCE LEHMAN

Attesting Officer

Commissioner of Patents and Trademarks